United States Patent [19]
Unger et al.

[11] Patent Number: 6,164,789
[45] Date of Patent: Dec. 26, 2000

[54] ILLUMINATION SOURCES AND SYSTEMS

[75] Inventors: Waltraud Rosalie Unger, Bergen; Scott Moore Zimmerman; Jerry W. Kuper, both of Somerset, all of N.J.; Tim Chin, Santa Clara, Calif.

[73] Assignee: Honeywell International Inc., Morristown, N.J.

[21] Appl. No.: 08/679,047

[22] Filed: Jul. 12, 1996

[51] Int. Cl.[7] ............................................. F21V 7/04
[52] U.S. Cl. ............................ 362/31; 362/27; 362/84
[58] Field of Search ........................ 362/27, 555, 558, 362/84, 247, 800, 235, 225, 31; 313/500

[56] References Cited

U.S. PATENT DOCUMENTS

| | | | |
|---|---|---|---|
| Re. 33,722 | 10/1991 | Scifres et al. ............................... | 385/33 |
| 4,935,665 | 6/1990 | Murata ...................................... | 313/500 |
| 5,396,350 | 3/1995 | Beeson et al. ............................. | 359/40 |
| 5,428,468 | 6/1995 | Zimmerman et al. ..................... | 359/40 |
| 5,462,700 | 10/1995 | Beeson et al. .......................... | 264/1.27 |
| 5,481,385 | 1/1996 | Zimmerman et al. ..................... | 359/40 |

FOREIGN PATENT DOCUMENTS

| | | |
|---|---|---|
| 0 192 164 A2 | 8/1986 | European Pat. Off. . |
| 0 500 089 A1 | 8/1992 | European Pat. Off. . |
| 0 751 340 A2 | 1/1997 | European Pat. Off. . |

OTHER PUBLICATIONS

Search Report for PCT/US97/11378 received Nov. 17, 1997.

*Primary Examiner*—Stephen Husar
*Attorney, Agent, or Firm*—John G. Shudy, Jr.; Colleen D. Szuch

[57] ABSTRACT

The reflectivity of a substrate can be improved by combining a reflective diffuse layer with a specular layer. The light output of individual light sources can be improved by embedding them in a composite diffuse and specular substrate resulting in a superior illumination source. A tapered coupling waveguide having a large input surface can be used to couple the illumination source to a thin waveguide having a relatively small input surface area.

14 Claims, 4 Drawing Sheets

ILLUMINATION SOURCES AND SYSTEMS

BACKGROUND OF THE INVENTION

For certain applications, a back-lit illumination system having a very shallow depth is highly desirable. Such systems are commonly configured with one or more light sources, a waveguide for collecting and distributing the light from the light source, and a collimating apparatus for extracting the light from the waveguide. A significant depth savings can be achieved by coupling the light source through the edge of the waveguide.

The amount of light extracted from the system is proportional to the number of reflections or bounces that occur within the waveguide, the number being inversely proportional to the thickness of the waveguide. To obtain maximum light output, a thin waveguide is preferable. However, this results in edges having a small surface area, limiting the size of the light source that can directly adjoin the edge of the waveguide. On the other hand, if the surface area of the edge is increased, the extraction efficiency of the waveguide will decrease.

It would be highly desirable to utilize a thin waveguide yet provide maximum light source input. Further, a highly reflective and powerful light source would also be desirable.

BRIEF DESCRIPTION OF DRAWINGS

The invention will be more fully understood and further advantages will become apparent when reference is made to the following detailed description of the invention and the accompanying drawings in which.

DESCRIPTION OF THE INVENTION

A thin waveguide can be used without sacrificing light input by coupling a large light source, or multiple light sources, to the waveguide edge through a coupling structure (e.g., a second waveguide) that tapers down from the light source to the dimensions of the waveguide edge. The broad face of the input to the coupling structure permits one to couple multiple sources (or a large light source) into the waveguide.

The performance of illumination systems can be further enhanced by using highly reflective substrates that combine the reflective qualities of both diffuse and specular materials. When used in combination, the thickness of the composite substrate can be significantly reduced and the reflectivity increased. Additionally, a superior illumination source offering high efficiency can be achieved by embedding planar light sources in the substrate.

Figure 1:
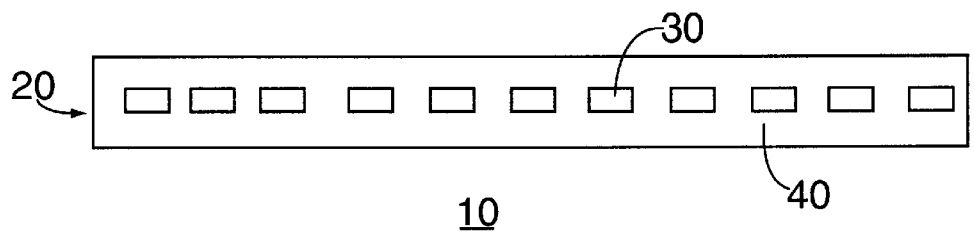
FIG. 1 is a schematic drawing of an illumination source having an array of light sources embedded in reflective material.
Figure 2:
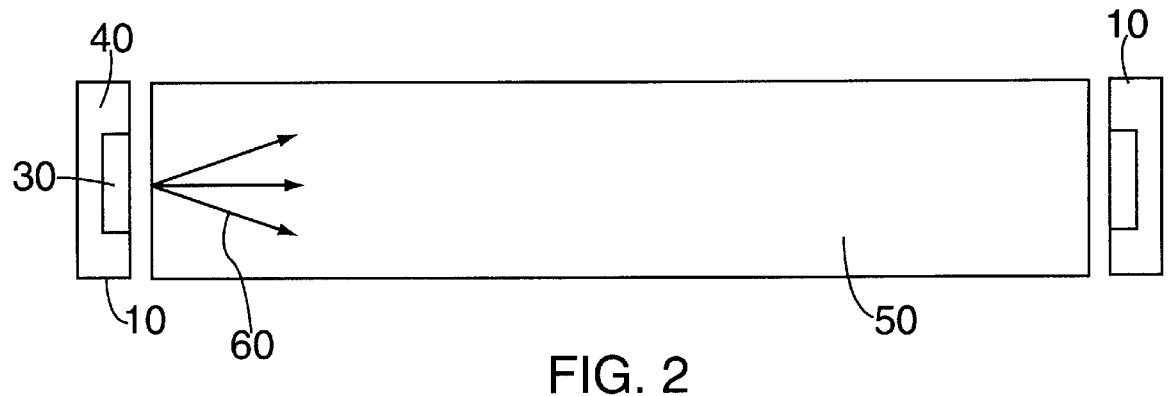
FIG. 2 is a schematic cross-sectional diagram of an illumination system utilizing the illumination source of FIG. 1 and a waveguide.

As illustrated in FIG. 1, an illumination source 10 that can be used with the illumination system described here contains an array 20 of one or more light sources 30 such as light emitting diodes (LEDs), flat fluorescent lamps, electroluminescent sources, or some other planar source suitable to the application embedded in a substrate 40 of highly reflective diffuse material. The illumination source 10 may be coupled to a waveguide as shown by the end views of the two illumination sources 10 adjacent the waveguide 50 in FIG. 2. The arrows 60 represent the dispersion of light rays received from the illumination source 10 within the waveguide 50.

Typically, the light sources 30 constitute a fraction of the total surface area of the substrate 40, ranging from about 10% to about 70%, and preferably from about 10% to about 30%. In addition to the linear arrangement of FIGS. 1 and 2, the light sources 30 could be configured in other layouts such as the two-dimensional array 70 of FIG. 3. Other shapes and configurations may be utilized (e.g., triangular, circular, hexagonal, etc.), as will readily occur to those skilled in the art. Although 5 mm spacing has been successfully employed, the spacing can range from about 0.25 millimeters to about 3 centimeters, depending on the brightness of the light source employed.

The light sources can be mounted on any suitable surface such as a copper-coated, glass-fiber board and spaced apart to achieve the desired luminance. Depending on thermal management needs, other mounting structures such as diamond or sapphire film can be used, as will readily occur to those skilled in the art.

The light sources 30 are affixed to an underlying board by soldering or some other suitable means as will readily occur to those skilled in the art. The substrate 40 is then provided with openings that conform to the outline of the light sources 30, allowing the light emitted by the light sources 30 to pass through the substrate 40. Alternatively, the light sources 30 could be placed on top of the substrate 40 and the electrical connections brought through.

Surface-mount LEDs having a size of approximately one millimeter square may be employed as the light sources, although other types and sizes of LEDs could be selected, as will be readily apparent to those skilled in the art. Suitable LEDs are commercially available from Dialight Corporation of Manasquan, N.J., Hewlett-Packard, and Nichia Chemical. Depending on the application, light sources of a single color (e.g., red, green, yellow, blue) or of multiple colors may be employed.

Figure 4:
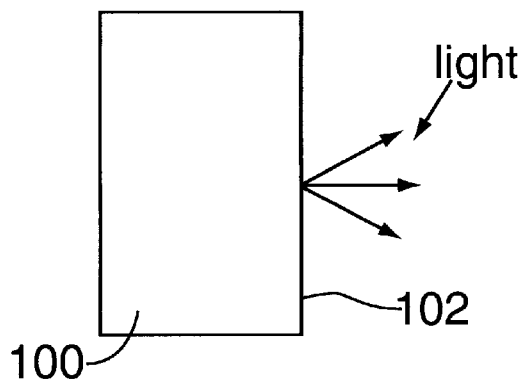
FIGS. 4–7 illustrate the reflective behavior of diffuse and specular materials of varying thicknesses and in combination.

To obtain the desired degree of reflectance, the substrate 40 must have sufficient depth. Materials exhibiting a very high reflectance, i.e., approaching 100%, for visible light, consist of diffuse scattering media with little or no absorption in the visible range. One example of a substrate having sufficient depth is the thick layer 100 of reflective diffuse material shown in the schematic cross-sectional diagram of FIG. 4. Where the thickness of the layer 100 of diffuse material is about 0.51 mm or greater, at least about 95% of the light is reflected at the surface 102.

Figure 5:
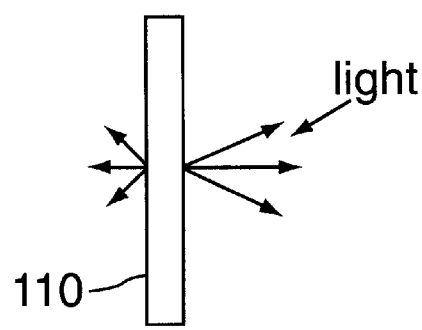
Figure 6:
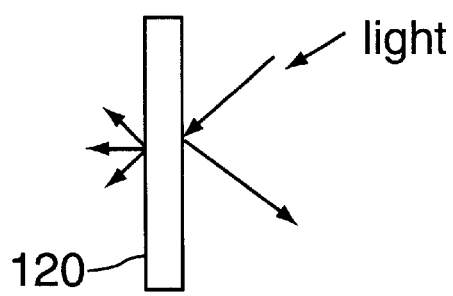

If the material is not sufficiently thick, a portion of the light energy will pass through the layer rather than be reflected. For example, for thicknesses of less than 0.2 mm, the reflectance for diffuse materials is low, typically less than 90%. As compared to the layer of FIG. 4, the relatively thin layer 110 of reflective diffuse of FIG. 5 thus reflects a smaller percentage of the incident light rays. Although the specular material of the thin reflective layer 120 of FIG. 6 will reflect approximately 80–95% of the incident light rays, it behaves like a mirror, and therefore diffuse material is preferred as it scatters the incident light rays.

Figure 7:
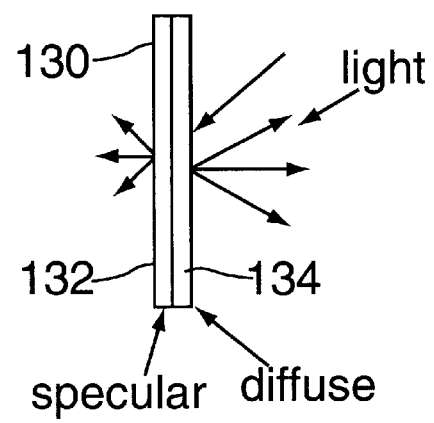

Since space is limited in many applications, it is desirable to combine the scattering effects of diffuse material with the shallow depth of specular material. One such combination is the composite reflector 130 shown in FIG. 7, having a thin specular backing layer 132 behind a thin diffuse scattering layer 134. The two layers 132 and 134 may be joined by simply placing them together, relying on surface tension, bonding, adhesion, or lamination, the latter being the preferred method of joining the two layers. Alternatively, the specular layer 132 can be sputtered onto the diffuse layer 134 or provided as a coating on the diffuse layer 134.

The benefit of providing a specular layer 132 behind a diffuse layer 134 is realized whenever the thickness of the diffuse layer 134 is less about 0.5 mm. In such instances, depending on the specific materials employed, the addition of the specular layer 132 layer can increase the reflectance to at least about 97%. A composite reflector 130 having an 0.2 mm thick diffuse layer of PTFE material and a 0.076 mm thick specular layer of silver film provided comparable results. The thickness of the specular layer 132 layer may range from about 0.25 $\mu$m to about 0.1 mm, depending on the materials used and the method of manufacture (e.g., sputtering).

It should be understood that other thicknesses and relative ratios could be employed as will be readily apparent to those skilled in the art. The composite reflector 130 of FIG. 7 may be employed in place of the substrate 40 in the illumination source 10 of FIGS. 1 and 2, resulting in a decrease of the physical depth required for the substrate when compared to substrates that are purely diffuse.

Diffuse materials suitable for the applications discussed here are Spectralon from Labsphere, Inc. and PTFE (Teflon) film from Furon or E.I. du Pont de Nemours & Co. Specular materials include Silverlux™, a product of z3M, and other highly-reflective (i.e., greater than 90% reflectance) materials such as aluminum, gold, and silver, as well as others as will readily occur to those skilled in the art. The reflectivity of any of the materials discussed may be measured using several commercially available instruments such as the Macbeth #7100 Spectrophotometer, New Windsor, N.Y,. or a Perkin Elmer #330 Spectrophotometer, Danbury, Conn. The specular materials may be deposited on a secondary surface or directly on the diffuse material by such techniques as chemical vapor deposition, electron beam vapor deposition, sputtering, and the like.

Figure 3:
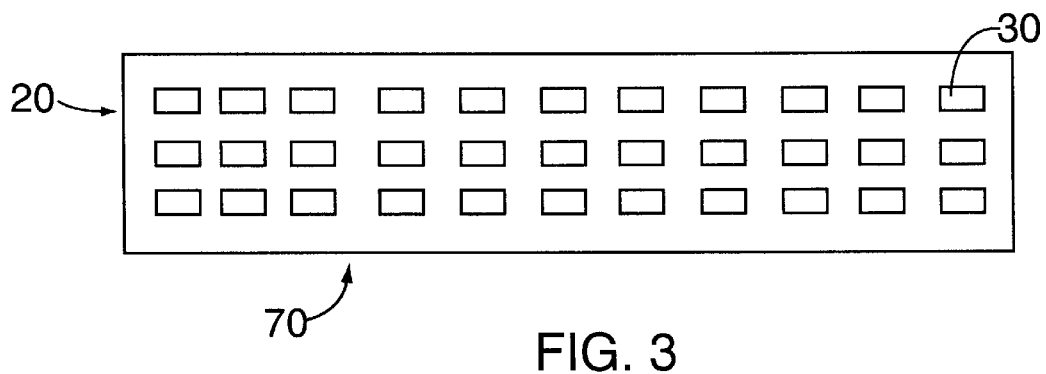
FIG. 3 is a schematic drawing of the illumination source of FIG. 1 having a two-dimensional array of light sources embedded in reflective material.
Figure 8:
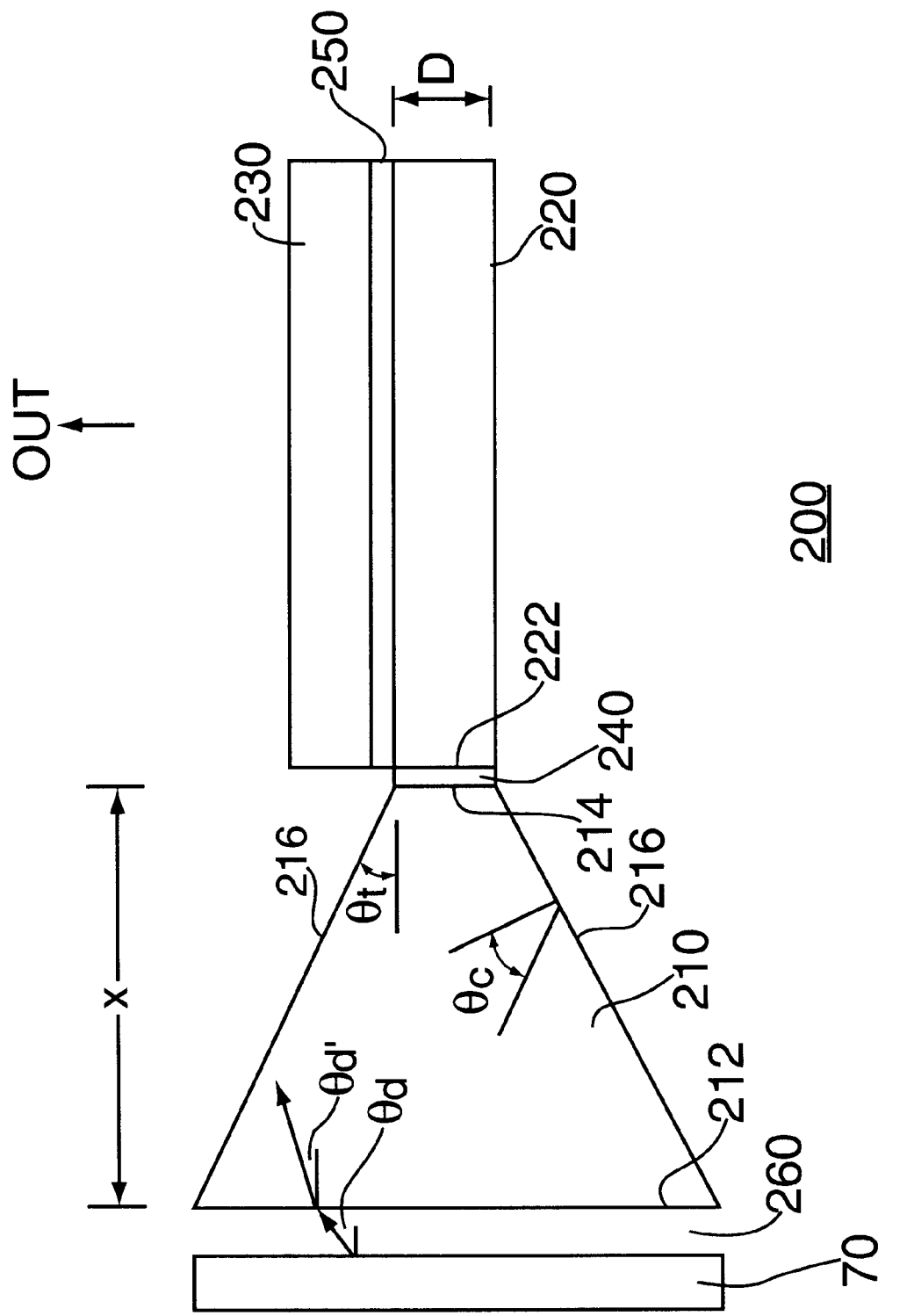
FIGS. 8 and 9 are cross-sectional and plan view diagrams, respectively, of an illumination system utilizing the illumination source of FIG. 3.

The output of the illumination source 70 of FIG. 3 may be used in an illumination system by coupling the light through a tapered coupling waveguide. In the illumination system 200 shown in the schematic cross-sectional view of FIG. 8, an illumination source 70 having a two-dimensional array of light sources is positioned adjacent the input surface 212 of a tapered coupling waveguide 210. Light leaves the tapered coupling waveguide 210 through an output surface 214, where it enters an output waveguide 220 through an edge input surface 222. In turn, the output waveguide 220 provides light energy to a light collimating assembly 230. The drawing in FIG. 8 is not drawn to scale; the actual relative dimensions may vary depending on the application.

An optically-transparent adhesion layer 240 located between the tapered coupling waveguide 210 and the edge input surface 222 of the output waveguide 220 insures maximum light transfer. The layer 240 can be made from any optically clear material having an index of refraction preferably substantially equal to that of the waveguides 210 and 220. Alternatively, the two waveguides 210 and 220 may be thermally fused or fused by a solvent using materials and techniques well known in the art. As desired and appropriate, adhesion layers may be employed between other components of the illumination system 200, e.g., between the output waveguide 220 and the light collimating assembly 230. A similar adhesion layer 250 is provided between the output waveguide 220 and the light collimating assembly 230. Again, the output waveguide 220 and the light collimating assembly 230 may be thermally fused or fused by a solvent.

At the junction of the illumination source 70 and the tapered coupling waveguide 210, an air gap 260 is provided to maximize refraction of the light as it enters the tapered coupling waveguide 210. Preferably, the air gap 260 is at least several wavelength in thickness, to permit refraction of the light travelling from the illumination source 70 into the tapered coupling waveguide 210.

The waveguides 210 and 220 and associated structure, including the adhesion layers, may be fabricated according to the methods and using such materials as polycarbonate, acrylic, polystyrene, glass, transparent ceramics, and a monomer mixture disclosed in U.S. Pat. No. 5,396,350, issued Mar. 7, 1995, to Beeson et al., for a Backlighting Apparatus Employing an Array of Microprisms, U.S. Pat. No. 5,448,468, issued Jun. 27, 1995, to Zimmerman et al., for an Illumination System Employing an Array of Microprisms, U.S. Pat. No. 5,462,700, Oct. 31, 1995, to Beeson et al., for a Process for Making an Array of Tapered Photopolymerized Waveguides, and U.S. Pat. No. 5,481, 385, issued Jan. 2, 1996, to Zimmerman et al., for a Direct View Display with Array of Tapered Waveguide, all of which are incorporated herein by reference.

The thickness D of the output waveguide 220 is kept small to maximize the number of reflections or bounces of light that enters from the output surface 214. The thickness D may range from about 0.5 to about 10 mm; typically, thicknesses from about 6 to about 8 mm have been employed. If light enters only through one edge, one may wish to provide a slight taper in the output waveguide 220 on the surface away from the collimating assembly 230 to optimize the number of bounces and therefore enhance the throughput of the output waveguide. The angle of taper may range from about 0.25° to about 2.0°; the actual angle is dependent on the length of the waveguide 220.

Optimally, total internal reflection (TIR) channels all of the light entering the tapered coupling waveguide 210 to the output surface 214. To accept the greatest amount of light, the input surface 212 of the tapered coupling waveguide 210 is made as large as possible. However, as the area of the input surface 212 increases with respect to the output surface 214, increasing the taper angle $\theta_t$, increasing amounts of light are likely to pass through one of the tapered surfaces 216 of the tapered coupling waveguide 210, especially if the individual LEDs have a wide output angular distribution. This occurs because the incident light rays strike those surfaces at less than the critical angle, defined as $\theta_c$, where $\theta_c = \sin^{-1}(n_1/n_2)$, normal to the tapered surface 216, and where $n_2$ is the index of refraction of the tapered coupling waveguide 210 and $n_1$ is the index of refraction of the material (e.g., air) outside of the tapered coupling waveguide 210. To avoid loss of light through failure of TIR, the taper angle $\theta_t$ must be minimized as much as possible while still providing an input surface 212 of sufficient area.

To select a taper angle $\theta_t$, the designer must consider the angular distribution ($\pm\theta_d$) of the output of the light sources, the indices of refraction of the tapered coupling waveguide 210 and the surrounding medium, and the maximum acceptable light loss. The taper angle $\theta_t$ can be derived from Snell's Law and the equation for the critical angle.

Assume that the LEDs have an output of $\pm\theta_d$. When the light rays from the LEDs enters the tapered coupling waveguide 210, the propagation angle is modified ($\pm\theta_{d'}$) according to the relative index of refraction, as set forth in Snell's Law:

$$n_1 \sin\theta_d = n_2 \sin\theta_{d'}.$$

Solving for $\theta_{d'}$, $$\theta_{d'} = \sin^{-1}(n_1/n_2 \sin\theta_d).$$

Light rays at the extreme angle $\theta_d$, impact a tapered surface 216 at an incident angle of $90°-(\theta_t+\theta_d)$ from the normal (with respect to the tapered surface 216). After reflection, the rays then impact the opposite tapered surface 216 at an incident angle of $90°-(2\theta_t+\theta_{d'})$ from the normal (with respect to the other tapered surface 216). In both cases, the incident angle must be greater than the critical angle to reflect.

Based on the foregoing, one can set forth the following generalized equation for determining the incident angle:

$$\theta_i = 90° - [(2(r-1)+1)\cdot\theta_t + \theta_{d'}]$$

where r is the number of reflections of the light rays. Given the equation for $\theta_i$, to insure that the light remains in the tapered coupling waveguide, $\theta_i$ must be selected such that $$\theta_i > \theta_c$$

or $$90° - [(2(r-1)+1)\cdot\theta_t + \theta_{d'}] > \sin^{-1}(n_1/n_2)$$

Solving for $\theta_t$, $$\theta_t < [90° - \theta_{d'} - \sin^{-1}(n_1/n_2)]/[2(r-1)+1)].$$

With this last relationship, a taper angle can be selected based on the LEDs employed, the relative index of refraction, and the number of reflections that will occur.

As a tradeoff, the size of the input surface can be enlarged to the point where a certain portion of the outer extremities of the LED radiation pattern is forfeited. Thus, while a certain percentage of the light output of the LEDs passes directly out of the tapered coupling waveguide 210, TIR keeps the majority of the light rays in the tapered coupling waveguide 210 and channels it to the output waveguide 220. The relationships discussed above can be used to optimize the light input achieved by increasing the size of the input surface 212 of the tapered coupling waveguide 210 against critical angle loss.

Figure 9:
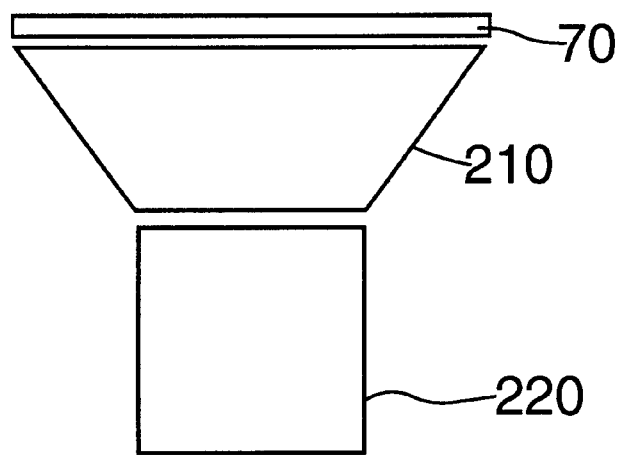
Figure 10:
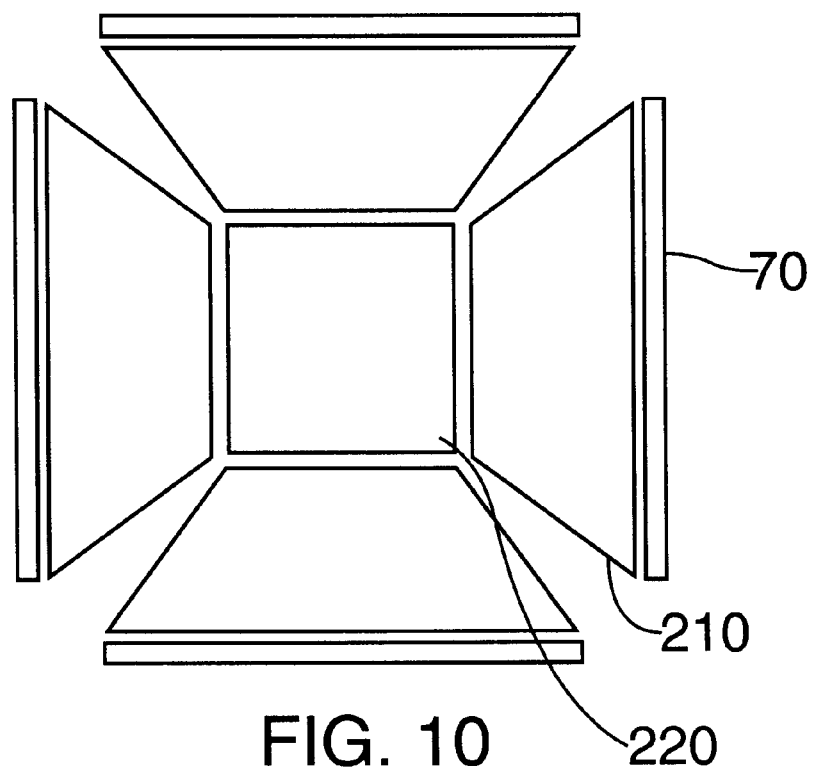
FIG. 10 is a plan view diagram of an alternative illumination system utilizing the illumination source of FIG. 3.

The illumination system 200 is shown again in the plan view diagram of FIG. 9. By adding from one to as many as three additional illumination sources 70 and associated tapered coupling waveguides 210, even more light energy can be provided to the output waveguide 220, as illustrated in FIG. 10. It should be understood from FIGS. 8, 9, and 10 that the tapered coupling waveguides 210 can be tapered in more than one direction, e.g., in both the x and y directions.

The distribution angle of the LEDs can be minimized by placing converging lenses over each LED. Such lenses are typically provided by the manufacturer of the LEDs; in some instances, the lenses are an integral part of the LED package.

In an alternative embodiment of the illumination system of FIGS. 8, 9, and 10, the tapered coupling waveguide 210 could be a hollow structure having mirrored specular surfaces for achieving reflection within the waveguide 210. The surfaces can be fabricated through a coating process or a sputtering process, or some other method as will readily occur to one skilled in the art. In another alternative embodiment, a commercially-available tapered fiber-optic bundle could be substituted for the solid or hollow tapered coupling waveguide 210.

It should be understood that this invention is applicable to a wide variety of devices such as direct illumination devices including lighting for commercial, office, residential, outdoor, automotive, and appliance applications. The invention may also be applied to displays for computer, automotive, military, aerospace, consumer, commercial, and industrial applications, and any other device requiring improved reflective materials to obtain an efficient illumination source.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An illumination source comprising:
 (a) a substrate of reflective material; and
 (b) at least one planar light source affixed to the substrate, wherein the substrate further comprises a first layer of diffuse, reflective material and a second layer of specular, reflective material adjacent to the first layer.

2. An illumination system, comprising:
 (a) an illumination source comprising (i) a substrate of reflective material; and (ii) at least one planar light source affixed to the substrate; and
 (b) a waveguide having an output surface and at least one edge input surface generally perpendicular to the output surface, where the edge input surface is adjacent the illumination source.

3. An illumination system as set forth in claim 2, wherein the light source is a light emitting diode, flat fluorescent lamp, or an electroluminescent source.

4. An illumination system as set forth in claim 2, wherein the substrate comprises a layer of diffuse, reflective material.

5. An illumination system as set forth in claim 4, wherein the substrate further comprises an additional layer of specular, reflective material adjacent the layer of diffuse, reflective material.

6. An illumination system as set forth in claim 2, wherein said planar light source comprises a plurality of light sources arranged in a two-dimensional array.

7. An illumination system, comprising:
 (a) an illumination source comprising
  (i) a substrate of reflective material; and
  (ii) at least one planar light source affixed to the substrate, the substrate having a surface area;
 (b) a generally planar output waveguide, the output waveguide having an output surface and at least one edge input surface generally perpendicular to the output surface, where the edge input surface has a surface area substantially less than the surface area of the substrate of the illumination source; and
 (c) a tapered coupling waveguide for coupling the output of the illumination source to the edge input surface of the output waveguide, the coupling waveguide comprising (i) an input surface for accepting the output of the illumination source, the input surface having a surface area approximately equal to and symmetrical with respect to at least a portion of the surface area of the substrate of the illumination source; and (ii) an output surface for providing light to the edge input surface of the output waveguide, the output surface having a surface area approximately equal to and symmetrical with respect to at least a portion of the surface area of the edge input surface of the output waveguide.

8. An illumination system as set forth in claim 7, wherein the second waveguide is a solid structure, a hollow structure with specular sloping surfaces, or a tapered bundle of fiber-optic cables.

9. An illumination system as set forth in claim 7, wherein the light source is a light emitting diode, flat fluorescent lamp, or an electroluminescent source.

10. An illumination system as set forth in claim 7, wherein said planar light source comprises a plurality of light sources arranged in a two-dimensional array.

11. An illumination system as set forth in claim 7, wherein the substrate comprises a layer of diffuse, reflective material.

12. An illumination system as set forth in claim 11, wherein the substrate further comprises an additional layer of specular, reflective material adjacent the layer of diffuse, reflective material.

13. An illumination system as set forth in claim 7, wherein the input and output surfaces of the tapered coupling waveguide are generally parallel.

14. An illumination system, comprising:
(a) an illumination source comprising
   (i) a substrate having a surface area, the substrate being fabricated from reflective material comprising a layer of diffuse, reflective material and an additional layer of specular, reflective material adjacent the layer of diffuse, reflective material; and
   (ii) a plurality of light emitting diodes embedded in the substrate and arranged in a two-dimensional array;
(b) a generally planar output waveguide, the output waveguide having an output surface and at least one edge input surface generally perpendicular to the output surface, where the edge input surface has a surface area substantially less than the surface area of the substrate of the illumination source; and
(c) a tapered coupling waveguide for coupling the light of the illumination source to the edge input surface of the output waveguide, the coupling waveguide comprising
   (i) an input surface for accepting the output of the illumination source, the input surface having a surface area approximately equidimensional and symmetrical with respect to the surface area of the substrate of the illumination source; and
   (ii) an output surface for providing light to the edge input surface of the output waveguide, the output surface having a surface area approximately equidimensional and symmetrical with respect to the surface area of the edge input surface of the output waveguide.

* * * * *